(12) United States Patent
Kurpejovic et al.

(10) Patent No.: US 11,110,408 B2
(45) Date of Patent: Sep. 7, 2021

(54) MIXER

(71) Applicant: Eberspächer Exhaust Technology GmbH, Neunkirchen (DE)

(72) Inventors: Enver Kurpejovic, Kirchheim unter Teck (DE); Ruben Hass, Stuttgart (DE); Roland Schwarz, Esslingen (DE); Adam Karch, Aichwald (DE); Elke Preisser, Neuhausen (DE)

(73) Assignee: Eberspächer Exhaust Technology GmbH, Neunkirchen (DE)

( * ) Notice: Subject to any disclaimer, the term of this patent is extended or adjusted under 35 U.S.C. 154(b) by 0 days.

(21) Appl. No.: 16/848,160

(22) Filed: Apr. 14, 2020

(65) Prior Publication Data

US 2020/0330935 A1 Oct. 22, 2020

(30) Foreign Application Priority Data

Apr. 16, 2019 (DE) .................... 10 2019 109 983.8

(51) Int. Cl.
*B01F 5/06* (2006.01)
*F01N 3/20* (2006.01)
(Continued)

(52) U.S. Cl.
CPC .......... *B01F 5/0691* (2013.01); *F01N 3/2066* (2013.01); *B01D 53/9431* (2013.01);
(Continued)

(58) Field of Classification Search
CPC ........ B01D 2251/2067; B01D 53/9431; B01F 2005/0091; B01F 3/04049; B01F 5/0451;
(Continued)

(56) References Cited

U.S. PATENT DOCUMENTS 8,371,114 B2 2/2013 Hayashi et al.
8,499,548 B2 * 8/2013 De Rudder ........... F01N 3/2066
60/286

(Continued)

FOREIGN PATENT DOCUMENTS

DE 10 2010 018743 A1 11/2011
DE 11 2014 003 949 T5 5/2016
(Continued)

*Primary Examiner* — Jesse S Bogue
(74) *Attorney, Agent, or Firm* — McGlew and Tuttle, P.C.

(57) ABSTRACT

A mixer for an exhaust system of an internal combustion engine includes a plate-shaped mixer body (26) with an incoming flow side (36) to be arranged oriented in the upstream direction in relation to an exhaust gas flow ($H_{A1}$) and with an outflow side (38) to be arranged oriented in the downstream direction in relation to the exhaust gas flow ($H_{A1}$), a first exhaust gas flow-through opening (30) in the mixer body (26), a reactant-receiving body (42) carried on the mixer body (26) in the area of the first exhaust gas flow-through opening (30), as well as a plurality of second exhaust gas flow-through openings (34) in the mixer body (26). The second exhaust gas flow-through openings (34) are arranged surrounding the first exhaust gas flow-through opening (30) in the mixer body (26).

17 Claims, 5 Drawing Sheets

(51) Int. Cl.
*B01D 53/94* (2006.01)
*B01F 3/04* (2006.01)
*B01F 5/04* (2006.01)
*B01F 5/00* (2006.01)
*F01N 3/28* (2006.01)

(52) U.S. Cl.
CPC .. *B01D 2251/2067* (2013.01); *B01F 3/04049* (2013.01); *B01F 5/0451* (2013.01); *B01F 2005/0091* (2013.01); *F01N 3/2892* (2013.01); *F01N 2240/20* (2013.01)

(58) Field of Classification Search
CPC .... B01F 5/0691; F01N 13/08; F01N 2240/20; F01N 2260/14; F01N 2470/02; F01N 2470/18; F01N 2610/02; F01N 2610/1453; F01N 3/2066; F01N 3/2892
See application file for complete search history.

(56) References Cited

U.S. PATENT DOCUMENTS

| | | | | |
|---|---|---|---|---|
| 8,539,761 | B2 * | 9/2013 | Lebas | B01F 3/04049 60/324 |
| 8,938,954 | B2 * | 1/2015 | De Rudder | F01N 3/035 60/317 |
| 9,512,767 | B2 * | 12/2016 | De Rudder | F01N 3/28 |
| 10,704,448 | B2 * | 7/2020 | Wang | F01N 3/206 |
| 2010/0005790 | A1 | 1/2010 | Zhang | |
| 2011/0308234 | A1 * | 12/2011 | De Rudder | F01N 3/36 60/295 |
| 2015/0110681 | A1 * | 4/2015 | Ferront | F01N 3/2892 422/168 |
| 2016/0131007 | A1 * | 5/2016 | Kauderer | F01N 13/0097 422/177 |
| 2016/0361694 | A1 | 12/2016 | Brandl et al. | |
| 2018/0306083 | A1 | 10/2018 | Sampath et al. | |
| 2019/0063291 | A1 | 2/2019 | Ker et al. | |

FOREIGN PATENT DOCUMENTS

| | | |
|---|---|---|
| DE | 10 2016 117900 A1 | 3/2017 |
| DE | 10 2016 104 361 A1 | 9/2017 |
| DE | 10 2018 106 286 A1 | 10/2018 |
| DE | 10 2018 119185 A1 | 2/2019 |
| DE | 10 2018 114 755 A1 | 12/2019 |
| WO | 2015028647 A1 | 3/2015 |
| WO | 2018222180 A1 | 12/2018 |

* cited by examiner

MIXER

CROSS REFERENCE TO RELATED APPLICATIONS

This application claims the benefit of priority under 35 U.S.C. § 119 of German Application 10 2019 109 983.8, filed Apr. 16, 2019, the entire contents of which are incorporated herein by reference.

TECHNICAL FIELD

The present invention pertains to a mixer for an exhaust system of an internal combustion engine, which can be used in the exhaust system to mix with the exhaust gas stream a reactant, for example, a urea/water solution acting as a reducing agent which is injected into the exhaust gas stream.

TECHNICAL BACKGROUND

To reduce the NOx content in the exhaust gas emitted by a diesel internal combustion engine, it is known to inject a reactant into the exhaust gas stream for carrying out a selective catalytic reduction (SCR) in order to bring about a catalytic conversion of the NOx transported in the exhaust gas at a SCR catalytic converter. A good mixing of the reactant with the exhaust gas is necessary for an efficient carrying out of this catalytic conversion.

SUMMARY

An object of the present invention is to provide a mixer for an exhaust system of an internal combustion engine which brings about an efficient mixing of a reactant injected into the exhaust gas stream with the exhaust gas when a low flow resistance is generated for the exhaust gas flowing in an exhaust system in case of a compact configuration.

This object is accomplished according to the present invention by a mixer for an exhaust system of an internal combustion engine, comprising:
  a plate-shaped mixer body with an incoming flow side to be arranged oriented in the upstream direction in relation to an exhaust gas flow and with an outflow side to be arranged oriented in the downstream direction in relation to the exhaust gas flow,
  a first exhaust gas flow-through opening in the mixer body,
  a reactant-receiving body carried on the mixer body in the area of the first exhaust gas flow-through opening, and
  a plurality of second exhaust gas flow-through openings in the mixer body, wherein the second exhaust gas flow-through openings are arranged in the mixer body surrounding (arranged about—to partially enclose) the first exhaust gas flow-through opening.

In principle, two different types of openings are provided in the mixer configured according to the present invention. On the one hand, a portion of the exhaust gas flowing through the mixer is fed through the first exhaust gas flow-through opening and in this case especially also interacts with the reactant-receiving body wetted with reactant. A direct interaction of the exhaust gas stream with the reactant received at the reactant-receiving body is brought about as a result. A swirling, which further enhances the efficient mixing of the exhaust gas and the reactant, is further brought about by the second exhaust gas flow-through openings surrounding the first exhaust gas flow-through opening. At the same time, the flow resistance introduced by such a mixer is comparatively low due to the plurality of openings and thus the possibility of providing a large overall opening cross section even if the plate-shaped mixer body is arranged upstream of the mixer essentially at right angles to an exhaust gas principal flow of direction.

For a good flowability through the mixer body, it may consequently be ensured that the first exhaust gas flow-through opening has an elongated configuration in the direction of an opening longitudinal axis. When an opening edge, which protrudes on the outflow side and preferably essentially fully encloses the first exhaust gas flow-through opening, is provided at the mixer body, it is possible to fix the reactant-receiving body, for example, in the area of the opening edge at the mixer body, on the one hand. On the other hand, a flow guiding effect feeding the exhaust gas stream through the mixer body in a defined manner can be achieved due to the opening edge.

The reactant-receiving body may be carried at the opening edge to provide a stable connection between the mixer body and the reactant-receiving body. In order to be able to provide a sufficient surface for the interaction with the reactant injected into the exhaust gas stream, it is further proposed that the reactant-receiving body be configured as protruding over the opening edge on the outflow side of the mixer body.

In order to be able to bring about an enhanced swirling or mixing of exhaust gas and reactant due to the second exhaust gas flow-through openings, it is proposed that a bulge which protrudes on the outflow side be provided at the mixer body in association with at least one second exhaust gas flow-through opening, preferably with each second exhaust gas flow-through opening, wherein the bulge is open for the provision of one of the second exhaust gas flow-through openings on a side facing the first exhaust gas flow-through opening. In this case, at least one bulge, preferably each of the bulges may have essentially the shape of a spherical cap segment. The exhaust gas arriving from the incoming flow side can be deflected on the inner side of a thus shaped bulge and can be released directed toward the first exhaust gas flow-through opening via the second exhaust gas flow-through opening which faces the first exhaust gas flow-through opening and is provided in the bulge. Since preferably all second exhaust gas flow-through openings are provided in this manner, an exhaust gas flow directed toward the first exhaust gas flow-through opening or the reactant-receiving body received therein is thus achieved almost over the entire circumferential area of the first exhaust gas flow-through opening.

Also, to keep the flow resistance introduced through the reactant-receiving body received in the first exhaust gas flow-through opening as low as possible, it is proposed that the reactant-receiving body provide a reactant-receiving body flow-through duct, through which exhaust gas can flow. Exhaust gas can thus flow through the reactant-receiving body and generates essentially no deflection especially of the exhaust gas flowing through the first exhaust gas flow-through opening.

For an efficient wetting of the reactant-receiving body with reactant injected into the exhaust gas stream, the reactant-receiving body may have a reactant-receiving area, which preferably tapers in a V-shaped manner (has a V-shaped taper) in the direction of the opening longitudinal axis. For this, the reactant-receiving body may have two mounting plate sections that are arranged bent at an angle to one another in the reactant-receiving area, wherein at least one reactant passage opening, and preferably a plurality of reactant passage openings that are open toward the reactant-receiving body flow-through duct are provided in at least one mounting plate section, preferably in each of the mounting plate sections.

The reactant-receiving body provided, for example, as a shaped sheet metal part may have a central area, which has an essentially ring segment-shaped configuration and encloses the reactant-receiving body flow-through duct in some areas and the mounting plate sections which are bent at an angle and preferably extend toward one another in an essentially uncurved manner starting from the central area. All areas of the reactant-receiving body interacting with the exhaust gas and with the reactant can thus be provided at one and the same component by shaping a metal sheet blank.

The present invention further pertains to an exhaust system for an internal combustion engine, comprising:
- a mixer housing,
- a first exhaust gas-carrying area (provided by a first exhaust gas-carrying conduit) adjoining the mixer housing in an upstream end area of this mixer housing,
- a second exhaust gas-carrying area (provided by a second exhaust gas-carrying conduit) adjoining the mixer housing in a downstream end area of this mixer housing,
- a mixer configured according to the present invention, which is arranged in a mixer carrying area of the mixer housing, wherein the mixer is arranged with its incoming flow side facing the first exhaust gas-carrying area, and
- a reactant release device, which is arranged downstream in relation to the mixer body at the mixer housing, for the release of reactant with a reactant principal direction of release directed toward the reactant-receiving body.

In order to guarantee that the entire exhaust gas fed upstream passes through the mixer and in this case also an efficient interaction with the reactant can be generated, it is proposed that the mixer body be arranged with its incoming flow side essentially at right angles to an exhaust gas principal direction of flow in the first exhaust gas-carrying area, and that the reactant principal direction of release be essentially at right angles to the exhaust gas principal direction of flow in the first exhaust gas-carrying area.

A flow deflection area may be formed in the mixer housing adjoining the mixer carrying area, and an exhaust gas principal direction of flow in the mixer housing upstream of the flow deflection area and an exhaust gas principal direction of flow in the mixer housing downstream of the flow deflection area are approximately at right angles to one another. A further improved mixing of the reactant and exhaust gas is brought about due to the deflection of the flow consisting of exhaust gas and reactant in the mixer housing, as a result of which a compact configuration is also supported.

At least one exhaust gas treatment unit, preferably an oxidation catalytic converter or/and particle filter or/and NOx storage catalytic converter may be arranged in the first exhaust gas-carrying area for an efficient exhaust gas treatment in the exhaust system configured according to the present invention. Further, at least one exhaust gas treatment unit, preferably SCR catalytic converter, may be arranged in the second exhaust gas-carrying area.

The present invention will be described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
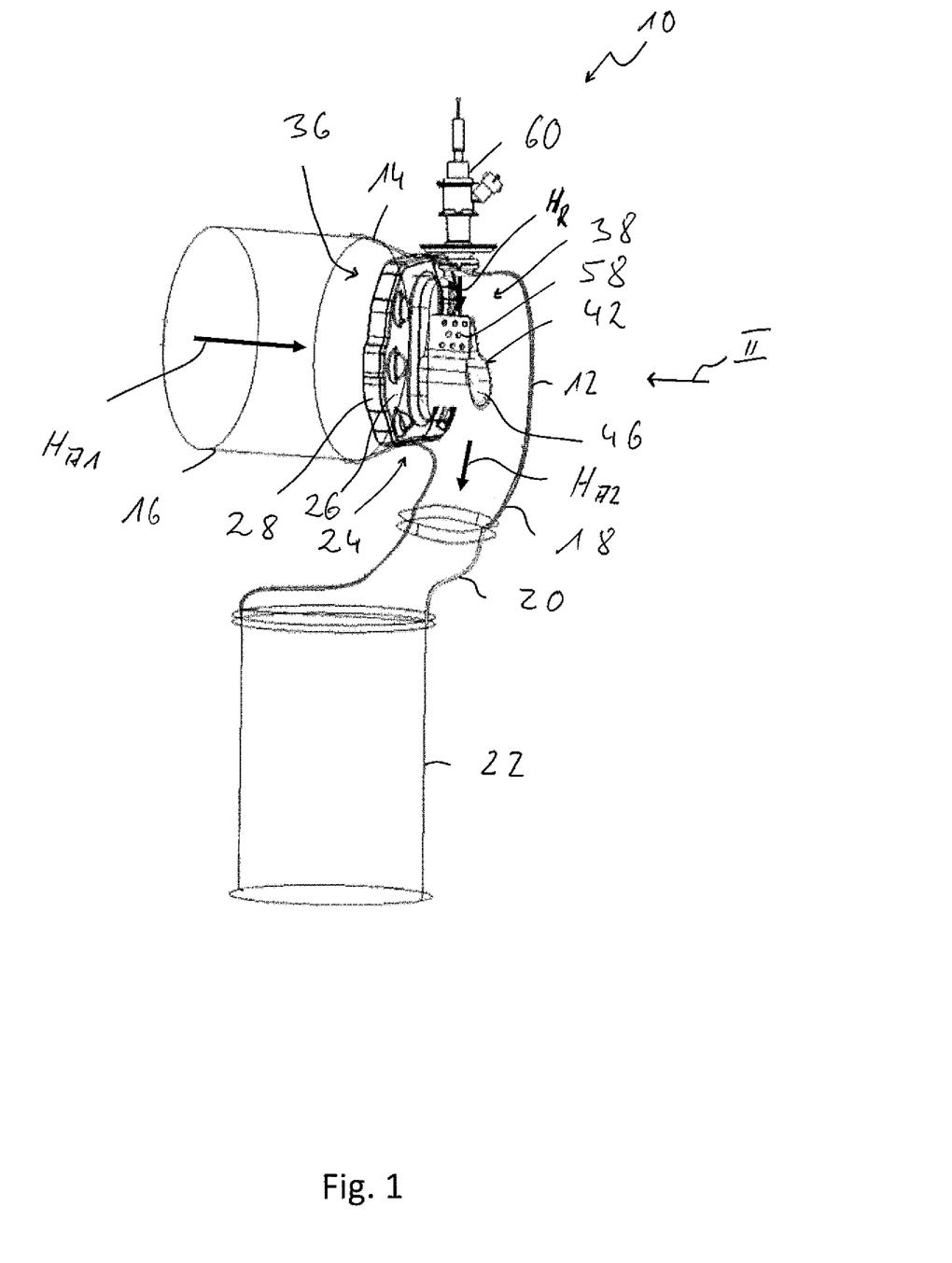
FIG. 1 is a partially sectional perspective view showing an exhaust system for an internal combustion engine.

Referring to the drawings, FIG. 1 shows an exhaust system which is generally designated by 10 and which can be integrated into an exhaust gas-carrying system releasing an exhaust gas from an internal combustion engine into the environment. The exhaust system 10 comprises a mixer housing 12 as central component. A tubular first exhaust gas-carrying conduit (having a first exhaust gas-carrying area) 16 is connected to an upstream end area 14 of the mixer housing 12. A tubular second exhaust gas-carrying conduit (having a second exhaust gas-carrying area) 22 is connected to a downstream end area 18 of the mixer housing 12 via an intermediate housing 20.

One or more exhaust gas treatment units may be provided in the first exhaust gas-carrying conduit 16. These exhaust gas treatment units may comprise, for example, an oxidation catalytic converter, especially a diesel oxidation catalytic converter or a particle filter. Also, an NOx storage catalytic converter as exhaust gas treatment unit may be arranged in the first exhaust gas-carrying conduit 16. One or more exhaust gas treatment units may also be provided in the second exhaust gas-carrying conduit 22. These exhaust gas treatment units may comprise, for example, a SCR catalytic converter.

A mixer generally designated by 24 is provided in the mixer housing 12 close to the upstream end area 14 of the mixer housing 12. The mixer 24 has a plate-shaped mixer body 26, which is adapted in its circumferential contour to the inner contour of the mixer housing 12. The mixer body 26 may be provided as a shaped sheet metal part and may have on a mixer body outer circumferential area a body edge 28 bent in the upstream direction also used for a stable fixing at the mixer housing 12.

In a mixer body central area, the mixer body 26 has a first exhaust gas flow-through opening 30 elongated in the direction of an opening longitudinal axis L. The first exhaust gas flow-through opening 30 is enclosed by an opening edge 32, which is oriented in the downstream direction and circulates about the first exhaust gas flow-through opening 30 essentially without any interruptions. The opening longitudinal axis L is essentially at right angles to an exhaust gas principal direction of flow $H_{A1}$ in the first exhaust gas-carrying conduit 16. In this exhaust gas principal direction of flow $H_{A1}$ in the first exhaust gas-carrying conduit 16, the exhaust gas flows through this exhaust gas-carrying conduit and an exhaust gas treatment unit provided therein in the direction toward the mixer 24. It is apparent that flow directions deviating locally from this exhaust gas principal direction of flow may be present.

A plurality of second exhaust gas passage openings 34 surrounding the first exhaust gas passage opening 30 are arranged in the mixer body 26. The second exhaust gas passage openings 34 thus form a ring-shaped structure extending about the opening edge 32 of second exhaust gas passage openings following one another in the circumferential direction. To provide these second exhaust gas passage openings 34, bulges 40 protruding in the direction away from an incoming flow side 36 located facing toward the first exhaust gas-carrying conduit 16, thus, i.e., in the direction toward an outflow side 38 located facing away from the first exhaust gas-carrying conduit 16, are formed in the plate-shaped mixer body 26. Each of these bulges 40 has the shape of a spherical cap segment, especially approximately one-fourth of a spherical body, and is oriented such that a corresponding second exhaust gas passage opening 34 is located facing the opening edge 32 or the first exhaust gas passage opening 30. While the exhaust gas flowing in the exhaust gas principal direction of flow $H_{A1}$ from the first exhaust gas-carrying conduit 16 towards the mixer body 26 flows through the first exhaust gas passage opening 30 approximately in this exhaust gas principal direction of flow $H_{A1}$ in the area of the bulges 40 or of the second exhaust gas passage openings 34 provided by same, a deflection of the exhaust gas stream takes place in the inward direction, i.e., toward the first exhaust gas flow-through opening 30, so that a focusing of the exhaust gas stream takes place with this configuration toward the area of the first exhaust gas passage opening 30.

A reactant-receiving body 42 is carried in the first exhaust gas flow-through opening 30 at the mixer body 26. The reactant-receiving body 42, which is shaped, for example, from a strap-like sheet metal blank, forms a central area 44, which has an approximately ring segment-like configuration and which encloses a reactant-receiving body flow-through duct 46, which is present in the reactant-receiving body 42. The reactant-receiving body 42 with its central area 44 is arranged in contact with the opening edge 32 of the first exhaust gas passage opening 30 at two leg areas 48, 50 located opposite one another and is fixed thereto, for example, by connection in substance, e.g., welding or soldering. Mounting plate sections 52, 54 bent at an angle to one another extend adjoining the leg areas 48, 50 of the central area 44 and thus form an essentially V-shaped reactant-receiving area 56 of the reactant-receiving body 42. A plurality of reactant passage openings 58 are each formed in the two mounting plate sections 52, 54, which have an essentially uncurved configuration and thus establish a connection to the reactant-receiving body flow-through duct 46 enclosed by the reactant-receiving body 42.

The reactant-receiving body 42 is arranged in the first exhaust gas passage opening 30 and at the plate-shaped mixer body 26 such that the reactant-receiving area 56 is configured as tapering in the direction of the opening longitudinal axis L. The V-type shape of the reactant-receiving area 56 thus points in the direction toward a reactant release device 60, which is generally also designated as an injector. This reactant release device 60 is carried at the mixer housing 12 downstream of the mixer body 26 such that reactant, for example, a urea/water solution released from this reactant release device 60 is released in a reactant principal direction of release HR downstream of the mixer body 26 into the mixer housing 12. The reactant principal direction of release HR may correspond essentially to the direction of extension of the opening longitudinal axis L, so that the reactant is released in the direction toward the reactant-receiving body 42 essentially in the longitudinal direction of the first exhaust gas passage opening 30. It should be pointed out that generally the reactant is released in the form of a spray cone, wherein the reactant principal direction of release HR may correspond to a central axis of such a spray cone.

The reactant released by the reactant release device 60 in the reactant principal direction of release HR toward the reactant-receiving area 56 essentially reaches the mounting plate sections 52, 54. The exhaust gas stream directed through the exhaust gas passage openings 34 in the direction toward the first exhaust gas passage opening 30 and toward the reactant-receiving body 42 also contributes to this. The reactant thus wets the outer circumferential surface of the reactant-receiving body 42 and enters through the reactant passage openings 58 into the interior space of the reactant-receiving body 42 and the reactant-receiving body flow-through duct 46. Straps 62, 64 that are bent inwards, each of which provides a collection surface for reactant that has entered the interior of the reactant-receiving body 42, are formed at the two leg areas 48, 50 of the central area 44. Thus, an efficient wetting of the surface of the reactant-receiving body 42 with reactant is guaranteed. Since the reactant-receiving body 42 is heated by the exhaust gas stream flowing around this body, the evaporation of the reactant released by the reactant release device 60 in the form of a spray mist is thus supported. In addition, the flow guiding especially also of the second exhaust gas flow-through openings 34 ensures an intense swirling of the exhaust gas stream in the area of the reactant-receiving body 42, which supports the mixing of the reactant and the exhaust gas.

Figure 5:
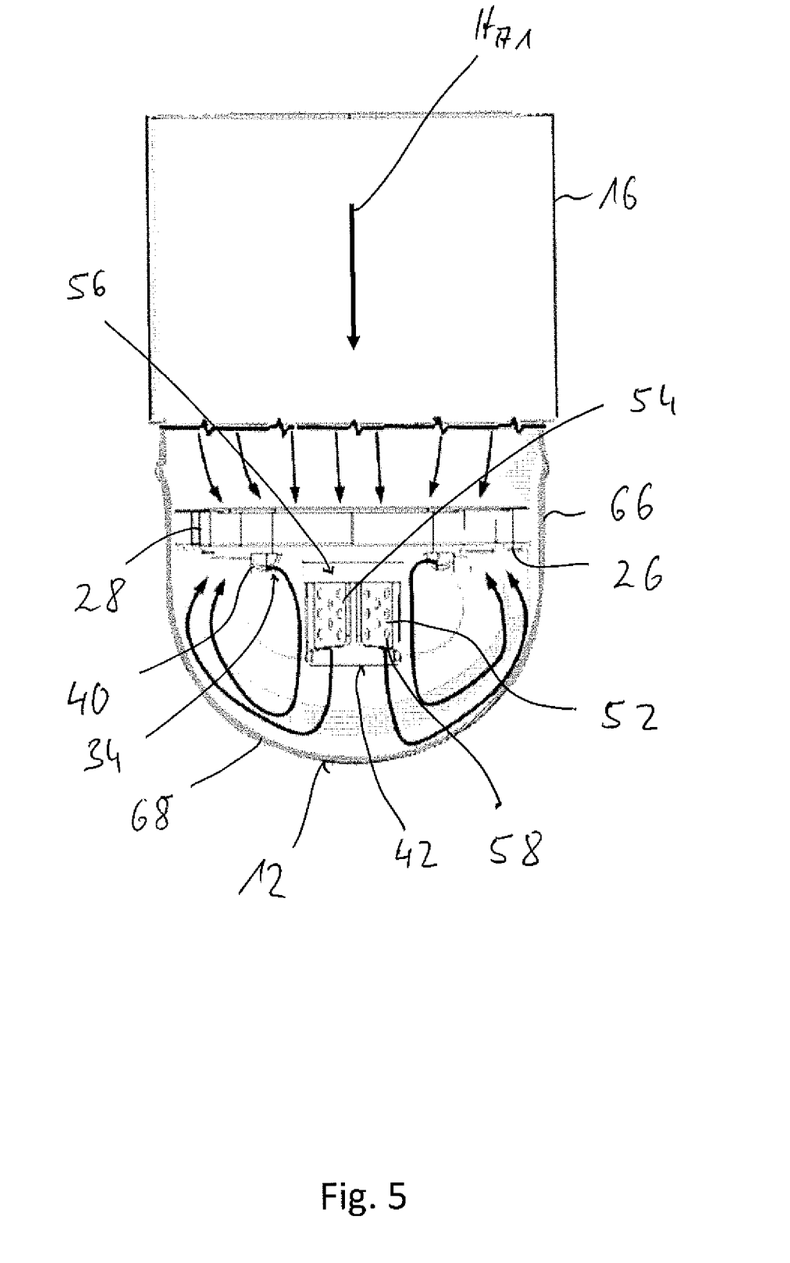
FIG. 5 is a top view, shown partially open, of the detail shown in FIG. 4 in viewing direction V in FIG. 4.

The thus produced mixture of reactant and exhaust gas flows on the outflow side 38 of the mixer 24 at first essentially in a direction corresponding to the exhaust gas principal direction of flow $H_{A1}$ in the first exhaust gas-carrying conduit 16. As FIG. 5 illustrates this, the stream of the mixture of the exhaust gas and reactant is, however, deflected at the inner surface of the mixer housing 12 and fed in the direction toward the downstream end area 18 of the mixer housing 12. For this, downstream of a mixer carrying area 66, in which the mixer body 26 with its body edge 28 is fixed to the mixer housing 12, the mixer housing 12 forms a flow deflection area 68, in which the exhaust gas flowing through the mixer 24 and the mixture of exhaust gas and reactant being released from same along the inner surface of the mixer housing 12 are deflected in the direction toward the downstream end area 18. In the area of this downstream end area 18 of the mixer housing 12, the exhaust gas flows essentially in an exhaust gas principal direction of flow $H_{A2}$, which is approximately at right angles to the exhaust gas principal direction of flow $H_{A1}$ in the first exhaust gas-carrying conduit 16 and also in the upstream end area 14 of the mixer housing 12. In this direction, the mixture of reactant and exhaust gas then flows in the direction toward the second exhaust gas-carrying conduit 22, wherein the SCR catalytic converter then carries out the selective catalytic reduction of NOx contained in the exhaust gas.

An efficient mixing of exhaust gas and reactant injected into same is achieved by the configuration according to the present invention. Since a plurality of openings allowing the passage of exhaust gas are provided in the mixer, this mixer introduces only a comparatively low flow resistance in spite of the fact that it is arranged with its incoming flow side approximately at right angles to the exhaust gas principal direction of flow upstream of the mixer. The mixer configured according to the present invention can be provided in a simple manner by shaping two sheet metal blanks, one of the sheet metal blanks being used for the configuration of a mixer body and the other of the sheet metal blanks being used for the configuration of the reactant-receiving body.

Figure 2:
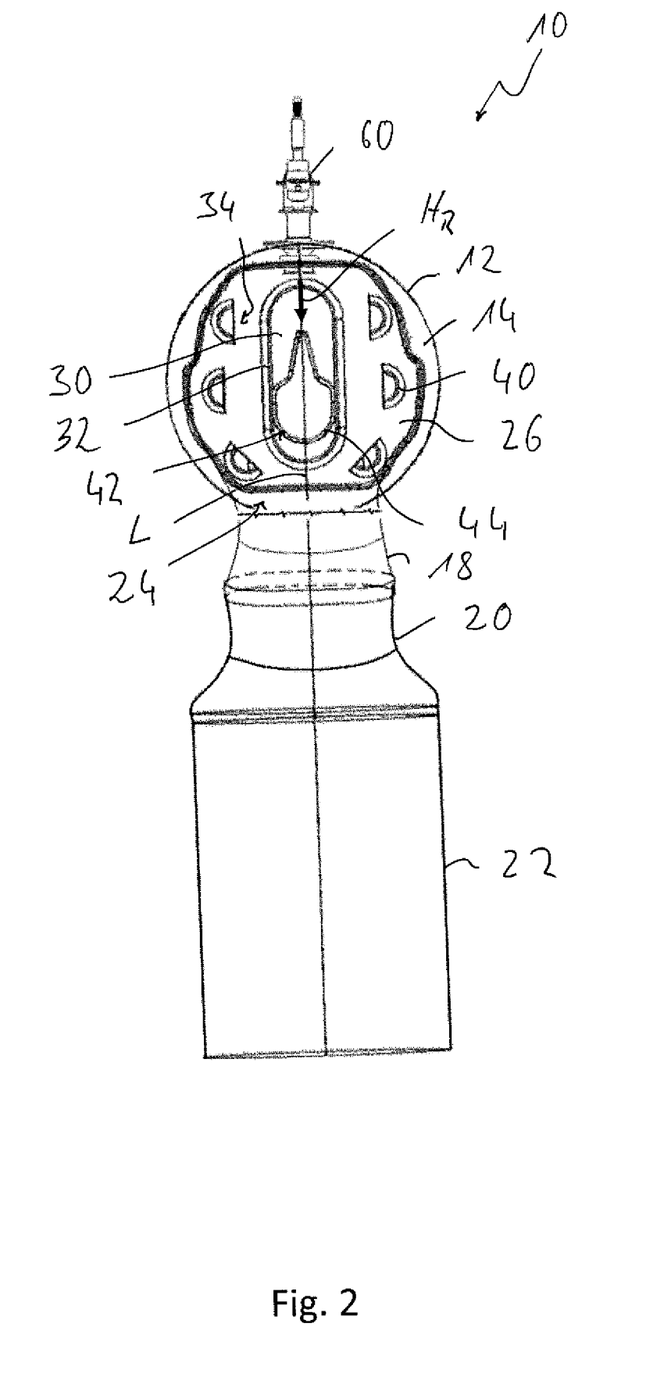
FIG. 2 is an end view showing the exhaust system according to FIG. 1 in viewing direction II in FIG. 1.
Figure 3:
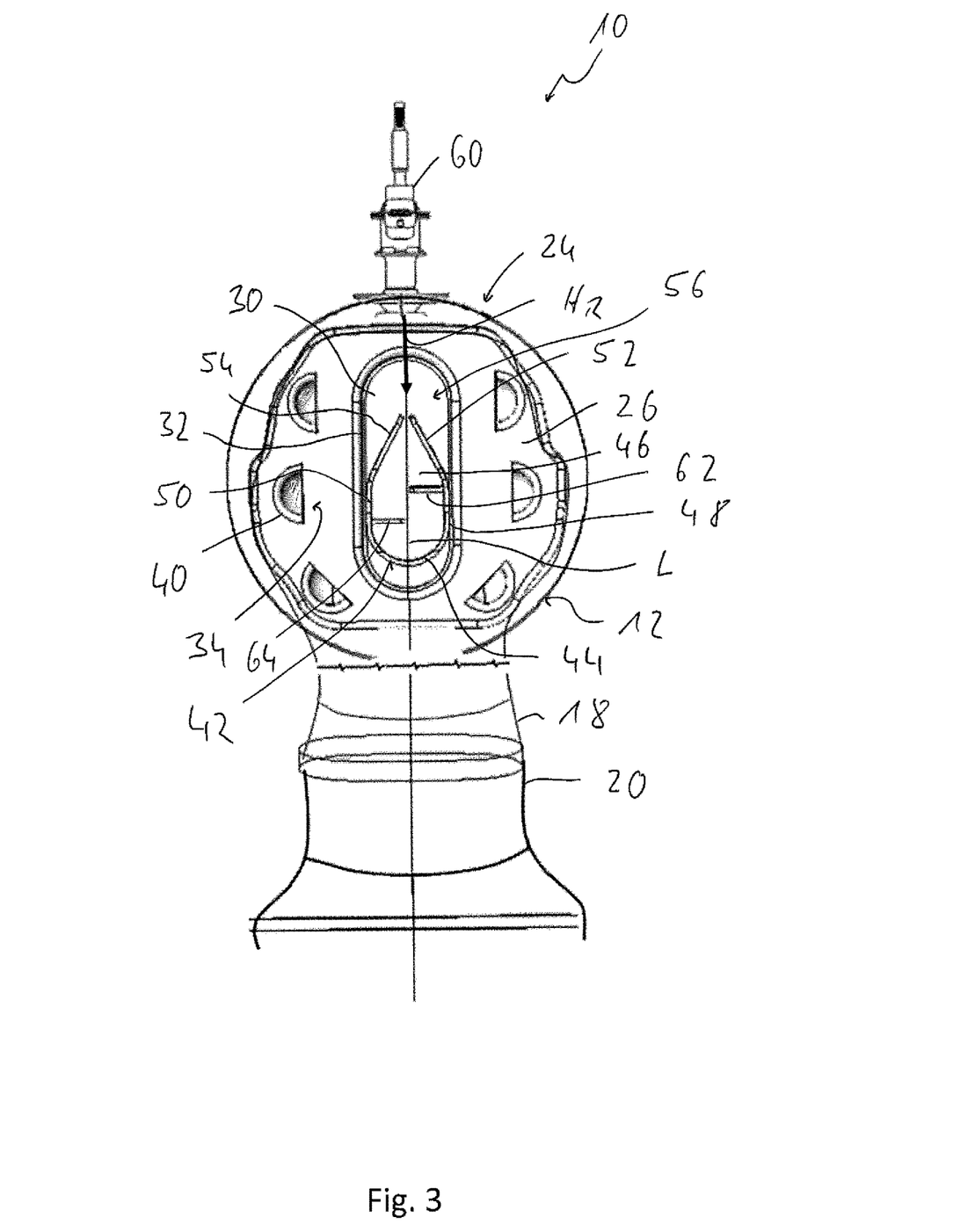
FIG. 3 is an enlarged view, corresponding to FIG. 2, showing the exhaust system.
Figure 4:
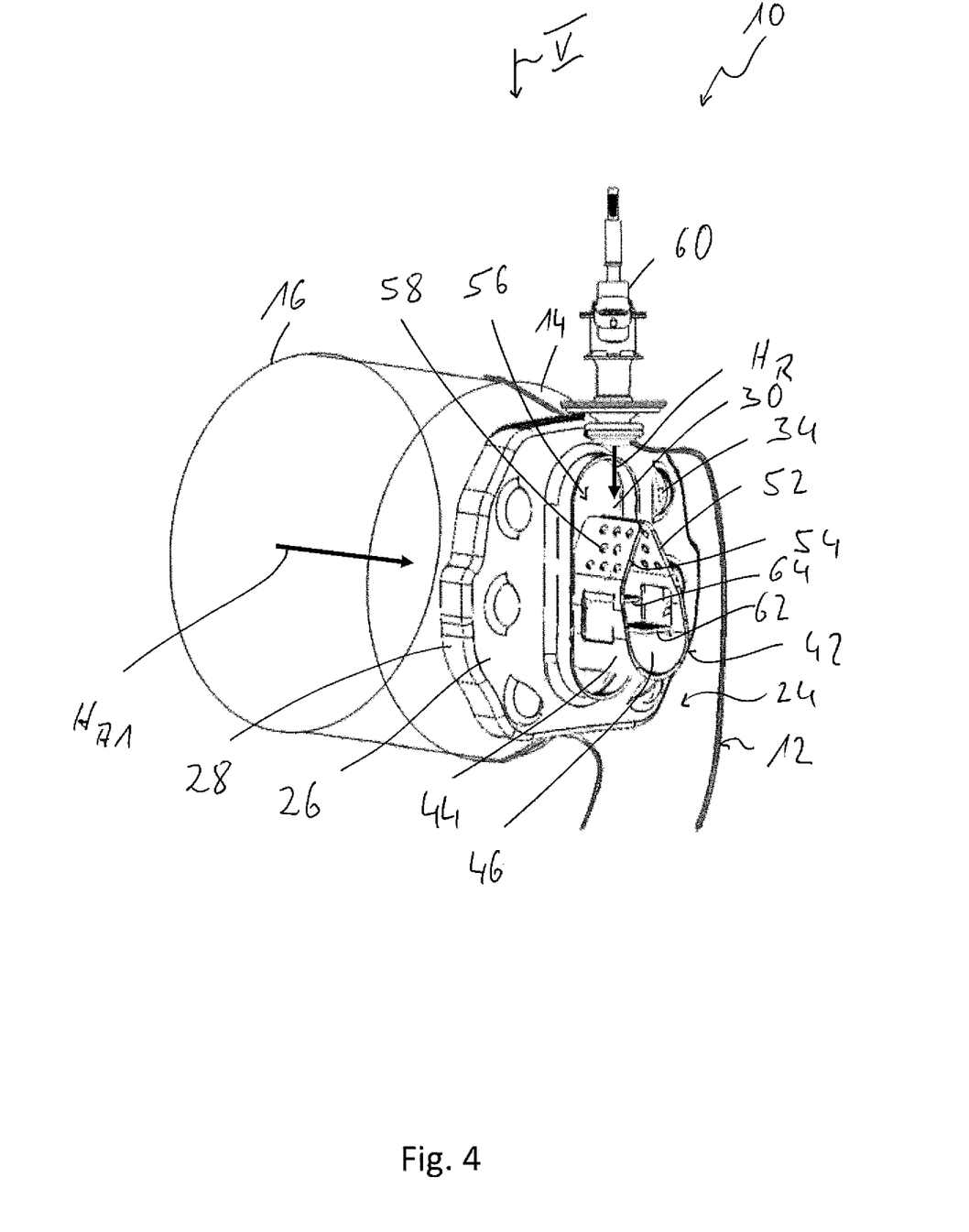
FIG. 4 is a perspective view showing the detail shown in FIG. 3 of the exhaust system.

It should be pointed out that embodiments deviating from the configuration shown in the figures are possible. Thus, for example, more or fewer second reactant passage openings and bulges providing same may be provided at the mixer body. In particular, for example, a second exhaust gas flow-through opening, which is correspondingly elongated and provided in the area of a bulge, could be provided on both sides of the first exhaust gas flow-through opening elongated in the direction of the opening longitudinal axis. These second exhaust gas flow-through openings are in the sense of the present invention arranged surrounding the first exhaust gas flow-through opening, especially extending along the outer circumferential area of same. As a comparison of FIGS. 2 and 3 clearly shows this, the reactant-receiving body may also be configured for providing the reactant-receiving area tapering in the direction toward the reactant release device with a wide variety of shapes especially in the transition between the ring segment-like central area and the mounting plate sections. In order to achieve the above-described flow deflection in the direction toward the first exhaust gas flow-through opening in the area of the second exhaust gas flow-through openings, deflecting straps, which are provided at the plate-shaped mixer body also by U-shaped notches in same and formed after the bending out from the plane of the mixer body in the direction toward the downstream side of same, might be provided.

While specific embodiments of the invention have been shown and described in detail to illustrate the application of the principles of the invention, it will be understood that the invention may be embodied otherwise without departing from such principles.

What is claimed is:

1. A mixer for an exhaust system of an internal combustion engine, the mixer comprising:
   a plate-shaped mixer body with an incoming flow side to be arranged oriented in an upstream direction in relation to an exhaust gas flow directed in an exhaust gas principal flow direction, and with an outflow side to be arranged oriented in a downstream direction in relation to the exhaust gas flow;
   a first exhaust gas flow-through opening in the mixer body, wherein the first exhaust gas flow-through opening is configured so as to be elongated in a direction of a first exhaust gas flow-through opening longitudinal axis extending essentially at right angles to the exhaust gas principal flow direction;
   a reactant-receiving body carried on the mixer body in an area of the first exhaust gas flow-through opening, wherein the reactant-receiving body defines a reactant-receiving body flow-through duct, through which exhaust gas can flow, and wherein the reactant-receiving body has a V-shaped reactant-receiving area tapering in a direction of the first exhaust gas flow-through opening longitudinal axis; and
   a plurality of second exhaust gas flow-through openings in the mixer body, wherein the second exhaust gas flow-through openings are arranged surrounding the first exhaust gas flow-through opening in the mixer body;
   wherein, in association with at least one second exhaust gas flow-through opening, the mixer body comprises a bulge, which protrudes on the outflow side and is open on a side facing the first exhaust gas flow-through opening.

2. The mixer in accordance with claim 1, wherein:
   the first exhaust gas flow-through opening is configured with an opening edge protruding on the outflow side.

3. The mixer in accordance with claim 2, wherein:
   the reactant-receiving body is carried on the opening edge; or
   the reactant-receiving body is configured as protruding over the opening edge on the outflow side of the mixer body; or
   the reactant-receiving body is carried on the opening edge and the reactant-receiving body is configured as protruding over the opening edge on the outflow side of the mixer body.

4. The mixer in accordance with claim 1, wherein the bulge has an essentially spherical cap segment shape.

5. The mixer in accordance with claim 1, wherein:
   the reactant-receiving body comprises two mounting plate sections arranged bent at an angle to one another in the reactant-receiving area; and
   at least one reactant passage opening, which is open toward the reactant-receiving body flow-through duct, is provided in at least one of the mounting plate sections.

6. The mixer in accordance with claim 5, wherein:
   the reactant-receiving body has a central area, which has an essentially ring segment configuration and encloses the reactant-receiving body flow-through duct in some areas; and
   the mounting plate sections extend toward one another, essentially uncurved, starting from the central area.

7. An exhaust system for an internal combustion engine, the exhaust system comprising:
   a mixer housing;
   a first exhaust gas-carrying conduit adjoining the mixer housing in an upstream end area of the mixer housing;
   a second exhaust gas-carrying conduit adjoining the mixer housing in a downstream end area of the mixer housing;
   a mixer arranged in a mixer carrying area of the mixer housing, wherein the mixer is arranged with an incoming flow side facing the first exhaust gas-carrying conduit, the mixer comprising:
      a plate-shaped mixer body with an incoming flow side arranged oriented in an upstream direction in relation to an exhaust gas flow directed in an exhaust gas principal flow direction in the first exhaust gas-carrying conduit and with an outflow side to be arranged oriented in a downstream direction in relation to the exhaust gas flow;
      a first exhaust gas flow-through opening in the mixer body, wherein the first exhaust gas flow-through opening is configured so as to be elongated in a direction of a first exhaust gas flow-through opening longitudinal axis extending essentially at right angles to the exhaust gas principal flow direction;
      a reactant-receiving body carried on the mixer body in an area of the first exhaust gas flow-through opening, wherein the reactant-receiving body defines a reactant-receiving body flow-through duct, through which exhaust gas can flow, and wherein the reactant-receiving body has a V-shaped reactant-receiving area tapering in a direction of the first exhaust gas flow-through opening longitudinal axis; and a plurality of second exhaust gas flow-through openings in the mixer body, wherein the second exhaust gas flow-through openings are arranged surrounding the first exhaust gas flow-through opening in the mixer body; and a reactant release device arranged downstream in relation to the mixer body at the mixer housing, for a release of reactant with a reactant principal direction of release directed toward the reactant-receiving body;

wherein, in association with at least one second exhaust gas flow-through opening, the mixer body comprises a bulge, which protrudes on the outflow side and is open on a side facing the first exhaust gas flow-through opening.

8. The exhaust system in accordance with claim 7, wherein:
the incoming flow side of the mixer body is arranged essentially at right angles to the exhaust gas principal flow direction; and
a reactant principal direction of release is essentially at right angles to the exhaust gas principal direction of flow in the first exhaust gas-carrying conduit.

9. The exhaust system in accordance with claim 7, wherein:
a flow deflection area is formed in the mixer housing adjoining the mixer carrying area; and
an exhaust gas principal direction of flow in the mixer housing, downstream of the flow deflection area, is approximately at right angles to an exhaust gas principal direction of flow in the mixer housing upstream of the flow deflection area.

10. The exhaust system in accordance with claim 7, further comprising an exhaust gas treatment unit arranged in the first exhaust gas-carrying conduit.

11. The exhaust system in accordance with claim 10, wherein the exhaust gas treatment unit is comprised of an oxidation catalytic converter or a particle filter or an NOx storage catalytic converter, or any combination of an oxidation catalytic converter and a particle filter and an NOx storage catalytic converter.

12. The exhaust system in accordance with claim 7, further comprising an exhaust gas treatment unit arranged in the second exhaust gas-carrying conduit.

13. The exhaust system in accordance with claim 12, wherein the exhaust gas treatment unit is comprised of a selective catalytic reduction catalytic converter.

14. The exhaust system in accordance with claim 7, wherein:
the first exhaust gas flow-through opening is configured so as to be elongated in a direction of a first exhaust gas flow-through opening longitudinal axis; or
the first exhaust gas flow-through opening is configured with an opening edge protruding on the outflow side; or
the first exhaust gas flow-through opening is configured so as to be elongated in a direction of a first exhaust gas flow-through opening longitudinal axis and the first exhaust gas flow-through opening is configured with an opening edge protruding on the outflow side.

15. The exhaust system in accordance with claim 14, wherein:
the reactant-receiving body is carried on the opening edge; or
the reactant-receiving body is configured as protruding over the opening edge on the outflow side of the mixer body; or
the reactant-receiving body is carried on the opening edge and the reactant-receiving body is configured as protruding over the opening edge on the outflow side of the mixer body.

16. The exhaust system in accordance with claim 15, wherein:
the reactant-receiving body has a reactant-receiving area;
the reactant-receiving body defines a reactant-receiving body flow-through duct, through which exhaust gas can flow;
the reactant-receiving body comprises two mounting plate sections arranged bent at an angle to one another in the reactant-receiving area; and
a reactant passage opening, which is open toward the reactant-receiving body flow-through duct, is provided in one of the mounting plate sections.

17. A mixer for an exhaust system of an internal combustion engine, the mixer comprising:
a plate-shaped mixer body with an incoming flow side to be arranged oriented in an upstream direction in relation to an exhaust gas flow directed in an exhaust gas principal flow direction, and with an outflow side to be arranged oriented in a downstream direction in relation to the exhaust gas flow;
a first exhaust gas flow-through opening in the mixer body, wherein the first exhaust gas flow-through opening is configured so as to be elongated in a direction of a first exhaust gas flow-through opening longitudinal axis extending essentially at right angles to the exhaust gas principal flow direction;
a reactant-receiving body carried on the mixer body in an area of the first exhaust gas flow-through opening, wherein the reactant-receiving body defines a reactant-receiving body flow-through duct, through which exhaust gas can flow, and wherein the reactant-receiving body has a V-shaped reactant-receiving area tapering in a direction of the first exhaust gas flow-through opening longitudinal axis;
a plurality of second exhaust gas flow-through openings in the mixer body, wherein the second exhaust gas flow-through openings are arranged surrounding the first exhaust gas flow-through opening in the mixer body;
wherein the reactant-receiving body comprises two mounting plate sections arranged bent at an angle to one another in the reactant-receiving area, at least one reactant passage opening, which is open toward the reactant-receiving body flow-through duct, being provided in at least one of the mounting plate sections; and
wherein the reactant-receiving body has a central area with an essentially ring segment configuration enclosing the reactant-receiving body flow-through duct in some areas, the mounting plate sections extending toward one another, essentially uncurved, starting from the central area.

* * * * *